March 7, 1967  RYOICHI NAGAI  3,307,791
APPARATUS FOR SEPARATING AND REMOVING SOLID FOREIGN
ELEMENTS IN BEATER FOR PROCESSING PAPER STOCK
Filed Sept. 9, 1964  3 Sheets-Sheet 3

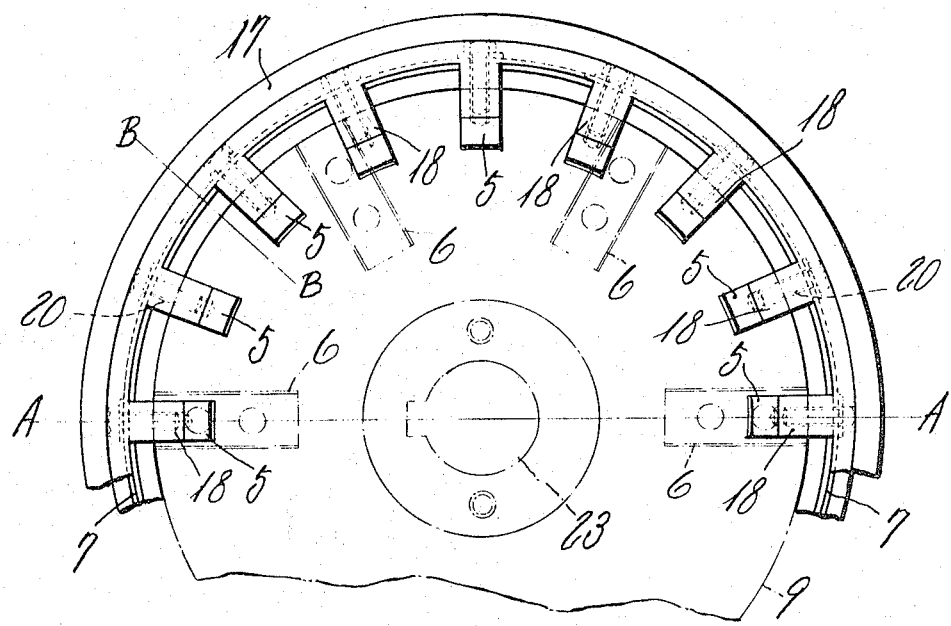
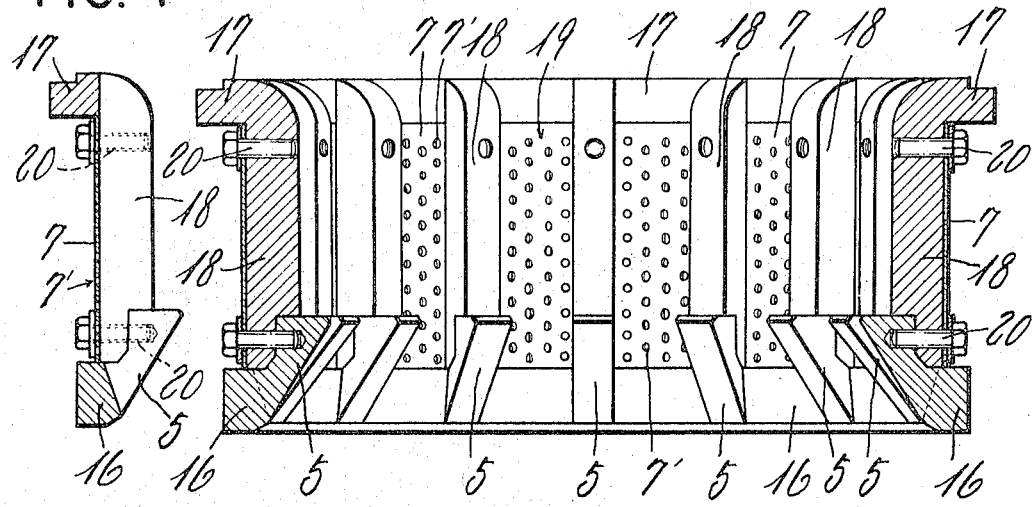

INVENTOR.
RYOICHI NAGAI
BY
*Hall & Houghton*
Attorney

United States Patent Office

3,307,791
Patented Mar. 7, 1967

3,307,791
APPARATUS FOR SEPARATING AND REMOVING SOLID FOREIGN ELEMENTS IN BEATER FOR PROCESSING PAPER STOCK
Ryoichi Nāgai, 1461—40 Aza Nikawa, Tatsu, Kurando, Takarazuka-shi, Japan
Filed Sept. 9, 1964, Ser. No. 395,182
Claims priority, application Japan, Oct. 25, 1963, 38/57,159; Nov. 25, 1963, 38/88,452; May 14, 1964, 39/37,601
3 Claims. (Cl. 241—74)

The present invention relates to an apparatus which beats paper stock and concurrently separates and removes solid impurities contained therein.

Conventionally, in beating paper stock or the like, separation and removal of impurities or foreign elements and screening of paper stock have been separately effected by individually installed different apparatuses. However, in an arrangement wherein a foreign element separating and removing apparatus and a screening apparatus are disposed in the rear of a beater, there have been disadvantages in that the blades of the beater are subject to damage due to foreign elements (such as iron scraps, staples, eyelets and sand). Generally, since the concentration of paper stock as passed through a beater differs from that as it is passed through a screen, the disposition of a foreign element separating and removing apparatus and a screening apparatus in front of a beater makes it necessary to purposely dilute the concentration of paper stock suited for the beater in order to adjust it to the foreign element separating and removing apparatus, with the result that it becomes necessary to concentrate the paper stock after being passed therethrough. This requires the provision of pumps and concentrators, resulting in the complication and high costs of the whole apparatus.

In view of these disadvantages inherent to the conventional methods of beating, the invention intends to improve the same, wherein a screen plate is tightly installed on the outer peripheral surface of stationary blades and through which is passed the refined paper stock free of impurities to collect in an introduction chamber from which it is then delivered, while foreign elements are discharged through an escapement clearance defined between the stationary and rotary blades and are then guided, together with the paper stock, into a precipitation tank. That is to say, according to the invention, the three operations, beating of stock, separation and removal of impurities and screening are effected at the same time, thereby increasing the efficiency of operation and avoiding the purposeful dilution of paper stock. Further, according to the invention, the centrifugal force of the rotary blades is utilized for extruding the refined paper stock through the screen plate, so that even with a screen plate having smaller area used, a raw paper material having a high concentration can effectively be passed therethrough with high efficiency.

The invention will now be described in more detail, by way of example, with reference to embodiments of the invention shown in the accompanying drawings, in which:

FIG. 2 is a plan view of stationary blades;

FIG. 3 is a front elevational view in longitudinal section taken along the line A—A of FIG. 2;

FIG. 4 is a sectional view taken along the line B—B of FIG. 2;

Figure 1:
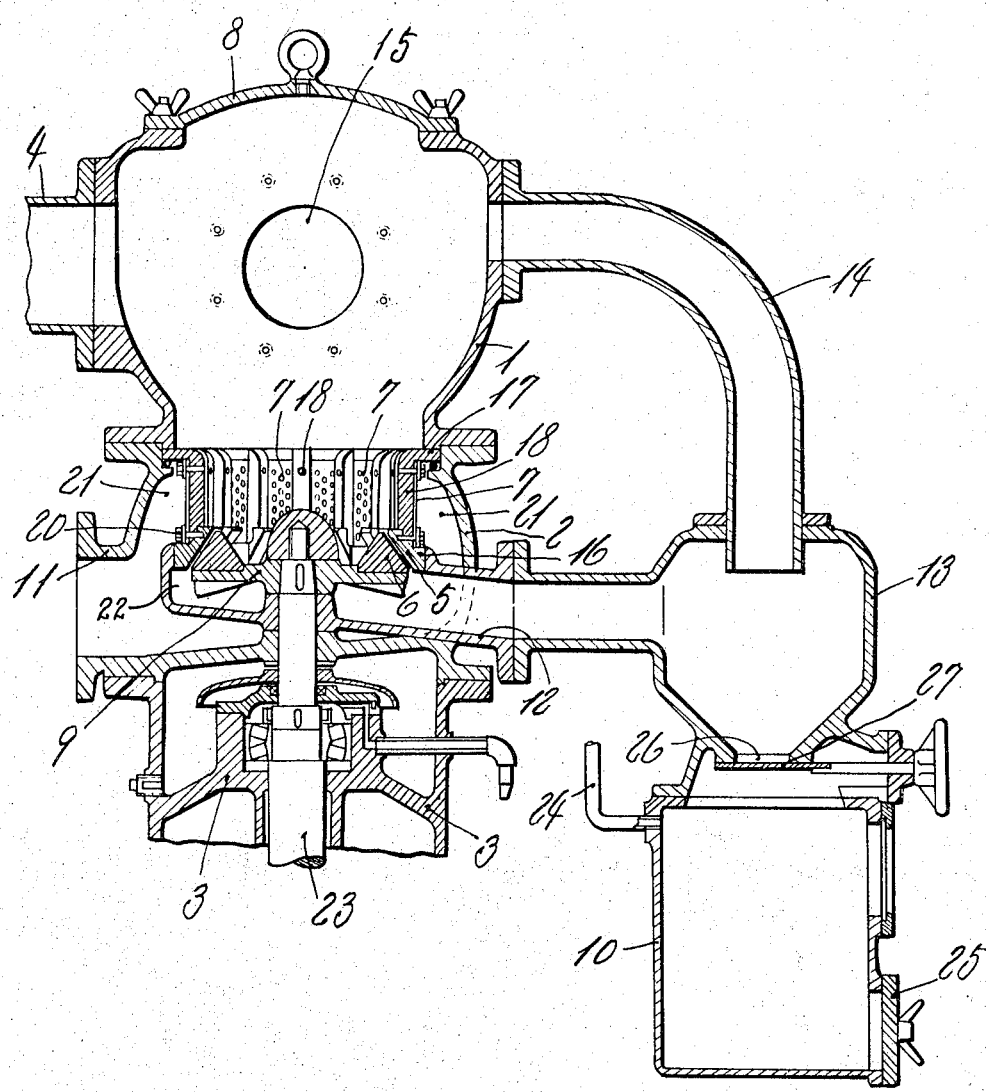
FIG. 1 is a front elevational view, in longitudinal section, of a novel and improved beater according to the invention.

In the drawings, 1 denotes an upper case, 2 an intermediate case, 3 a lower bearing case, 4 a raw material inlet pipe, 5 stationary blades, 6 rotary blades, 7 a screen plate, 8 a cover, 9 a rotary disc, 10 a precipitation tank for impurities, 11 a discharge pipe, 12 a second discharge pipe for impurity-containing raw material, 13 a cyclone collector, 14 a pipe for returning the refined material obtained after the separation and removal of its foreign elements therefrom, 15 a peep window, 23 a rotary shaft of the rotary disc 9, and 24 a pressure water inlet pipe.

Figure 5:
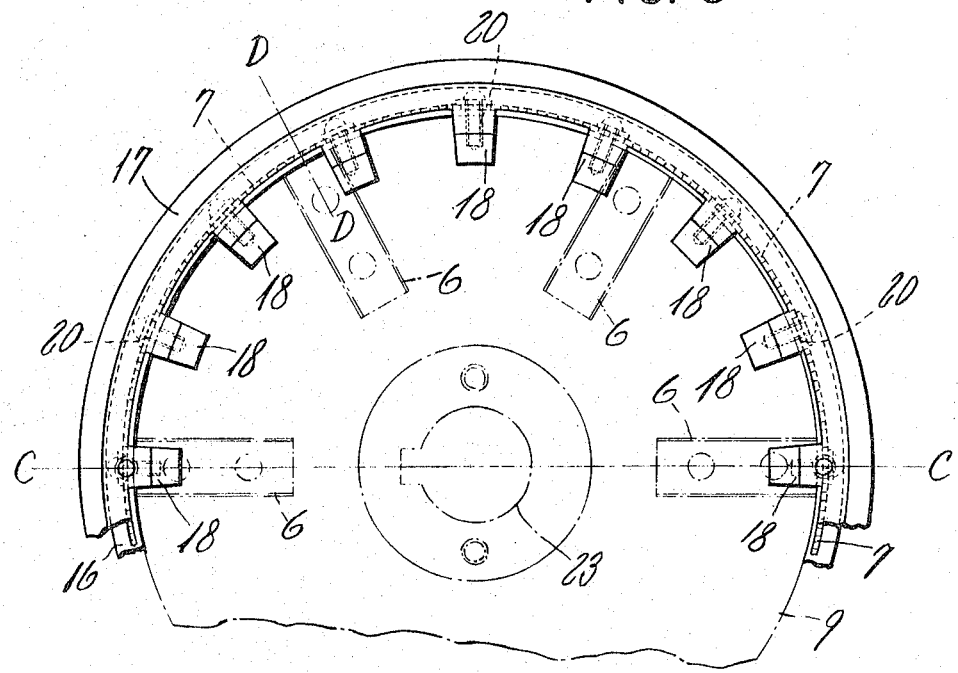
FIG. 5 is a plan view of stationary blades according to another embodiment of the invention.
Figures 6, 7:
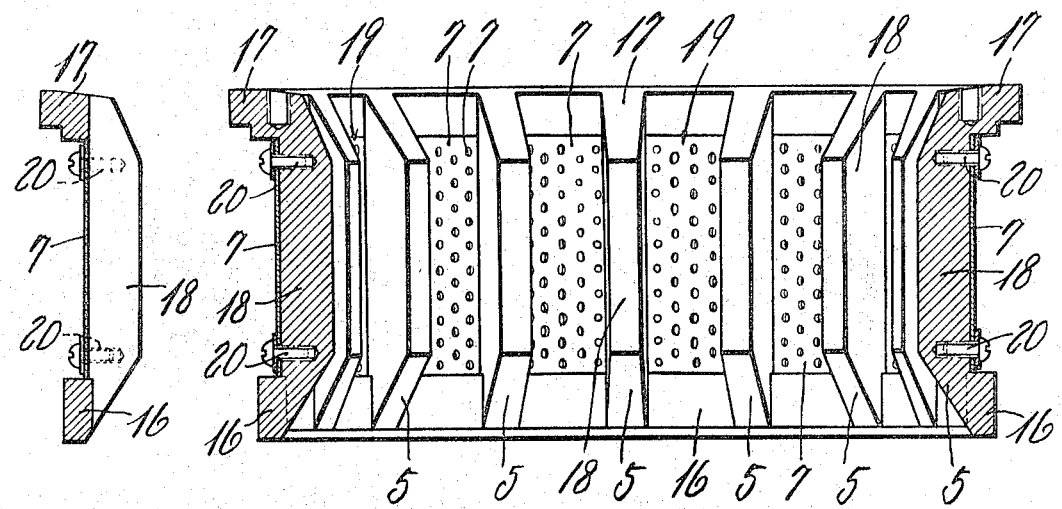
FIG. 6 is a front elevational view in longitudinal section taken along the line C—C of FIG. 5.
FIG. 7 is a sectional view taken along the line D—D of FIG. 5.

As shown in FIGS. 5 through 7, the stationary blades 5 are so provided as to project from the inner surface of circular frame plate 16. In the figures, 20 denotes screws for attaching the screen plate.

Between an upper attaching annular member 17 and said lower circular frame plate 16, the upper and lower ends of a number of connectors 18 spaced at regular intervals are respectively jointed thereto to form a unitary body. The screen plate 7 is tightly installed on the entire outer peripheral surface of the group of circularly arranged parallel connectors 18.

In each of the spaces between the parallel rows of the connectors 18, there is formed a rectangular window 19, with said circular frame plate 16 and annular member 17 respectively defining the upper and lower sides and said connectors defining the lateral sides thereof. The outer surfaces of the rectangular windows are shut off by the screen plate 7. The attachment of the screen plate 7 is effected by means of the screws 20 screwed into the outer surface of the connectors 18. As is apparent from the drawings, the connector 18 is in the form of a square pillar having both side edges thereof adapted to perform cutting action.

Unbeaten paper stock flows through the inlet pipe 4 into the upper case 1. Since such unbeaten paper stock is composed of various waste papers such as newspapers, magazines, account books and the like, it contains staples, pins, small ironware, nails, sand, etc. The paper stock flowing into the upper case 1 gradually precipitates to collect within the circular frame plate 16 where it is gradually beaten by the stationary blades 5 and rotary blades 6. And the thoroughly beaten paper stock is outwardly pressed by centrifugal force due to the rotation of the rotary blades 6 and flows through small holes 7' formed in the surrounding screen plate 7 into an introduction chamber 21 within the intermediate case 2, from which it is gradually delivered through the discharge pipe 11.

The solid foreign elements such as nails, small ironware, staples and the like do not pass through the small holes 7' of the screen plate 7 but precipitate onto the lower bottom and finally fall, together with the raw material, through a clearance (see FIG. 5) between the periphery of the rotary disc 9 and the circular frame plate 16 into a foreign element separating chamber 22. The solid foreign elements together with the paper stock flow from the discharge pipe 12 into a cyclone collector 13 where the solid foreign elements are separated from the paper stock by centrifugal force due to the rotation, while the paper stock flows back into the upper case 1 through the return pipe 14. The solid foreign elements which have collected on the bottom of the precipitation tank 10 are sometimes taken out by opening a cover plate 25. In order that the pressure within the precipitation tank 10 may be counter-balanced by the pressure of the material flowing thereinto to allow only the heavy impurities to precipitate, there is provided a pressure water inlet pipe 24 connected to the precipitation tank 10 thereby constantly maintaining a pressure within the tank 10.

The blades 5 are the parts that are most likely to be worn out. In case that they are worn out, it would be somewhat uneconomical if the upper annular member 17, lower circular frame plate 16 and connectors 18 are integrally constructed as shown in FIGS. 5 through 7, because the whole of these must be thrown away and replaced by a new unit. Therefore, according to the invention, as shown in FIGS. 1 through 4, the connectors 18 and the lower circular frame plate 16 are separately constructed so that the lower circular frame plate 16 may be attached to the lower ends of the connectors by the screws 20, and the stationary blades 5 are secured to the inner surface of the lower circular frame plate 16 so as to be spaced at regular intervals (at the same distances as the connectors 18). These screws 20 serve also for attaching the screen plate 7. Such arrangement makes the construction of the stationary blades 5 easier and less expensive. Besides, in case that the stationary blades 5 are worn out, such arrangement makes it sufficient to replace only the circular frame plate 16 integral with the stationary blades 5 while the upper annular member 17 and connectors 18 are left as they are, thereby achieving economy.

As mentioned above, since the invention is so arranged that the stationary blades 5 are secured to the inner surface of the circular frame plate 16 in a circular form and the screen plate 7 is tightly installed on the outer peripheral surface thereof, the beating and the screening of paper stock can be effected at the same time to promote the efficiency of operation.

Further, since the invention is so arranged that the rectangular windows 19 are defined by the upper annular member 17, connectors 18 and lower circular frame plate 16 for disposing and securing a large number of stationary blades 5, and the screen plate 7 is tightly installed on the outer surface thereof to attach the screen plate 7 by the screws 20 by utilization of the stationary blades 5, the structure for attaching the screen plate 7 is very simple and easy to manufacture.

While some forms of the invention have been shown and described herein, it is to be understood that the same is not so limited but shall cover and include any and all modifications of the invention which fall within the scope thereof.

What I claim is:

1. An apparatus for separating and removing solid foreign elements in a beater for processing paper stock and the like, characterized by comprising a screen plate tightly installed to surround a plurality of circularly arranged stationary blades, rotary blades on a rotary circularly arranged disc and brought close to the stationary blades, and an escapement passageway allowing the passage and discharge of foreign elements defined by a clearance between the periphery of the rotary disc and the stationary blades, whereby the foreign elements which fall into a foreign element separating chamber at the lower part of the rotary disc through said escapement clearance by the action of centrifugal force due to the rotation of the rotary disc are allowed to be discharged into a precipitation tank, and the refined paper stock beaten by the stationary and rotary blades is passed through the screen plate by utilization of centrifugal force to be introduced into an introduction chamber outside the foreign element separating chamber, from which introduction chamber it is then delivered through a discharge pipe.

2. An apparatus for separating and removing solid foreign elements in a beater for processing paper stock and the like, characterized in that an upper attaching annular member 17 and a lower circular frame plate 16 are vertically interconnected by means of a plurality of connectors 18 arranged at regular intervals, thereby forming a unitary body, and screen plate 7 is tightly installed on the entire outer peripheral surface of the group of circularly arranged parallel connectors 18.

3. An apparatus for separating and removing solid foreign elements in a beater for processing paper stock and the like, characterized in that a lower circular frame plate 16 on the inner surface of which are integrally and equidistantly arranged stationary blades 5 projecting therefrom is rigidly connected to an upper annular member 17 at a fixed distance, said lower circular frame plate being adapted to be removably attached to the lower ends of a number of connectors 18 by screws 20.

No references cited.

WILLIAM W. DYER, JR., *Primary Examiner.*

G. A. DOST, *Assistant Examiner.*